(12) United States Patent
Abe (10) Patent No.: US 9,454,717 B2
(45) Date of Patent: Sep. 27, 2016

(54) IMAGE FORMING SYSTEM, INTEGRATED CIRCUIT CHIP, AND IMAGE FORMING APPARATUS

(71) Applicant: BROTHER KOGYO KABUSHIKI KAISHA, Nagoya-shi, Achi-ken (JP)

(72) Inventor: Naoki Abe, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/831,462

(22) Filed: Aug. 20, 2015

(65) Prior Publication Data
US 2016/0063362 A1    Mar. 3, 2016

(30) Foreign Application Priority Data

Aug. 29, 2014    (JP) .................................. 2014-176045

(51) Int. Cl.
G03G 15/00    (2006.01)
G06K 15/12    (2006.01)
G03G 15/043   (2006.01)

(52) U.S. Cl.
CPC ......... *G06K 15/1219* (2013.01); *G03G 15/043* (2013.01)

(58) Field of Classification Search
CPC .............. G03G 15/221; G03G 15/04072; G03G 15/326; G03G 15/04018; B41J 2/45
USPC ............................................................ 399/4
See application file for complete search history.

(56) References Cited

U.S. PATENT DOCUMENTS

| | | | |
|---|---|---|---|
| 5,461,414 A | 10/1995 | Honda et al. | |
| 9,207,560 B2* | 12/2015 | Abe ................ | G03G 15/04072 |
| 9,250,557 B2* | 2/2016 | Shiomichi ........ | G03G 15/04036 |
| 9,268,250 B2* | 2/2016 | Ishikawa ............ | G03G 15/043 |
| 2004/0184827 A1* | 9/2004 | Yamada ............. | G03G 15/5008 399/44 |
| 2011/0229172 A1* | 9/2011 | Miyadera ............. | G02B 26/123 399/51 |
| 2014/0063286 A1 | 3/2014 | Okada et al. | |
| 2014/0118456 A1* | 5/2014 | Kondo ................ | G03G 15/043 347/118 |
| 2016/0063363 A1 | 3/2016 | Abe | |

FOREIGN PATENT DOCUMENTS

| | | |
|---|---|---|
| JP | 9-323446 A | 12/1997 |
| JP | 10-157196 A | 6/1998 |
| JP | 3187131 B2 | 7/2001 |
| JP | 2007-320160 A | 12/2007 |
| JP | 2012-011632 A | 1/2012 |

OTHER PUBLICATIONS

Machine translation of Asatani JP 2007-320160 A, publication date: Dec. 13, 2007.*
Application as filed in related U.S. Appl. No. 14/831,471, on Aug. 20, 2015.
U.S. Office Action issued in related U.S. Appl. No. 14/831,471, Jan. 25, 2016.
Office Action (Notice of Allowance) issued in related U.S. Appl. No. 14/831,471, mailed May 18, 2016.

* cited by examiner

*Primary Examiner* — Walter L Lindsay, Jr.
*Assistant Examiner* — Frederick Wenderoth
(74) *Attorney, Agent, or Firm* — Merchant & Gould P.C.

(57) ABSTRACT

An integrated circuit chip configured to be connected to an image forming apparatus having a light source, a photosensitive member, and a light receiver includes a synchronizing signal output circuit, a data output circuit, an OR circuit, a chip-side communicator, first and second wiring lines. The synchronizing signal output circuit is configured to output a synchronizing signal for lighting the light source. The data output circuit is configured to output an image data signal for lighting the light source. The OR circuit is configured to output a lighting signal that is a logical sum of the synchronizing signal and the image data signal. The chip-side communicator is configured to transmit the lighting signal to the image forming apparatus. The first wiring line connects the synchronizing signal output circuit with the OR circuit. The second wiring line connects the data output circuit with the OR circuit.

14 Claims, 8 Drawing Sheets

IMAGE FORMING SYSTEM, INTEGRATED CIRCUIT CHIP, AND IMAGE FORMING APPARATUS

CROSS REFERENCE TO RELATED APPLICATIONS

This application claims priority from Japanese Patent Application No. 2014-176045 filed Aug. 29, 2014. The entire content of the priority application is incorporated herein by reference.

TECHNICAL FIELD

The disclosure relates to an image forming system, an integrated circuit chip, and an image forming apparatus.

BACKGROUND

Conventionally, an image forming apparatus is known in which a light beam emitted by a light source is reflected by a rotating member and is emitted to a photosensitive member. This image forming apparatus has a rotation controller, a forced signal output circuit, a light receiver, and an image data output circuit. The rotation controller controls rotation of the rotating member. The forced signal output circuit outputs a forced lighting signal. The light beam emitted from the light source based on the forced lighting signal and reflected by the rotating member is received by a light receiver. The light receiver outputs a detection signal in response to reception of the light beam. The image data output circuit outputs an image data signal at timing corresponding to output of the detection signal from the light receiver. The light beam emitted from the light source based on the image data signal and reflected by the reflector forms a scanning line on the photosensitive member.

In such an image forming apparatus, the rotation controller and the forced signal output circuit are arranged in the same unit, and are provided at the same integrated circuit chip constituting the unit. A detection signal from the light receiver is inputted to this integrated circuit chip. The rotation controller and the forced signal output circuit are controlled to perform operations based on the detection signal. Further, the rotation controller is connected to the forced signal output circuit, so as to enable communication of signals needed for controlling the operations.

SUMMARY

According to one aspect, this specification discloses an image forming system. The image forming system includes an integrated circuit chip and an image forming apparatus configured to be connected to the integrated circuit chip. The image forming apparatus includes a light source, a motor, a rotating member, a photosensitive member, a light receiver, and a rotation controller. The rotating member is configured to be rotated by the motor and to reflect a light beam emitted from the light source. The photosensitive member is configured to be irradiated by the light beam reflected by the rotating member. The light receiver is configured to receive the light beam reflected by the rotating member. The rotation controller is configured to control rotation of the motor, by switching a signal for controlling rotation of the motor between a frequency signal having frequency depending on a rotational speed of the motor and an output signal that is outputted in response to reception of the light beam by the light receiver. The integrated circuit chip includes a synchronizing signal output circuit, a data output circuit, an OR circuit, and an instruction signal output circuit. The synchronizing signal output circuit is configured to output a synchronizing signal for lighting the light source. The data output circuit is configured to output an image data signal for lighting the light source. The OR circuit is configured to output, to the light source, a lighting signal that is a logical sum of the synchronizing signal and the image data signal. The instruction signal output circuit is configured to output an instruction signal to the rotation controller in response to input of the output signal. In response to input of the instruction signal in a state where the motor is rotated based on the frequency signal, the rotation controller is configured to switch the signal for controlling rotation of the motor to the output signal.

According to another aspect, this specification also discloses an integrated circuit chip configured to be connected to an image forming apparatus having a light source, a photosensitive member, and a light receiver. The integrated circuit chip includes a synchronizing signal output circuit, a data output circuit, an OR circuit, a chip-side communicator, a first wiring line, and a second wiring line. The synchronizing signal output circuit is configured to output a synchronizing signal for lighting the light source. The data output circuit is configured to output an image data signal for lighting the light source. The OR circuit is configured to output a lighting signal that is a logical sum of the synchronizing signal and the image data signal. The chip-side communicator is configured to transmit the lighting signal to the image forming apparatus. The first wiring line connects the synchronizing signal output circuit with the OR circuit. The second wiring line connects the data output circuit with the OR circuit.

According to still another aspect, this specification also discloses an image forming apparatus configured to be connected to an integrated circuit chip configured to output a lighting signal. The image forming apparatus includes a light source, a motor, a rotating member, a photosensitive member, a light receiver, a rotation controller, and an apparatus-side communicator. The rotating member is configured to be rotated by the motor and to reflect a light beam emitted from the light source. The photosensitive member is configured to be irradiated by the light beam reflected by the rotating member. The light receiver is configured to receive the light beam reflected by the rotating member. The rotation controller is configured to control rotation of the motor, by switching a signal for controlling rotation of the motor between a frequency signal having frequency depending on a rotational speed of the motor and an output signal that is outputted in response to reception of the light beam by the light receiver. The apparatus-side communicator is configured to transmit the output signal to the integrated circuit chip. In response to receiving the instruction signal from the integrated circuit chip through the apparatus-side communicator in a state where the motor is rotated based on the frequency signal, the rotation controller is configured to switch the signal for controlling rotation of the motor to the output signal.

The technology disclosed in this specification can be realized in various modes. For example, the technology can be realized in modes of an image forming apparatus, an exposure device, a controller that controls a motor and that outputs a lighting signal to a light source, and so on.

BRIEF DESCRIPTION OF THE DRAWINGS

Embodiments in accordance with the disclosure will be described in detail with reference to the following figures wherein.

DETAILED DESCRIPTION

The inventor considered, due to a reason of the circuit configuration, disposing a rotation controller outside an integrated circuit chip at which a synchronizing signal output circuit (forced signal output circuit) is provided. Conventionally, however, operations of the rotation controller have not been fully considered in which the rotation controller is disposed outside the integrated circuit chip at which the synchronizing signal output circuit is provided. It is desired to provide technology for controlling rotation of the rotating member even when the rotation controller is disposed outside the integrated circuit chip at which the synchronizing signal output circuit is provided.

Some aspects of the disclosure will be described while referring to the accompanying drawings.

Figure 1:
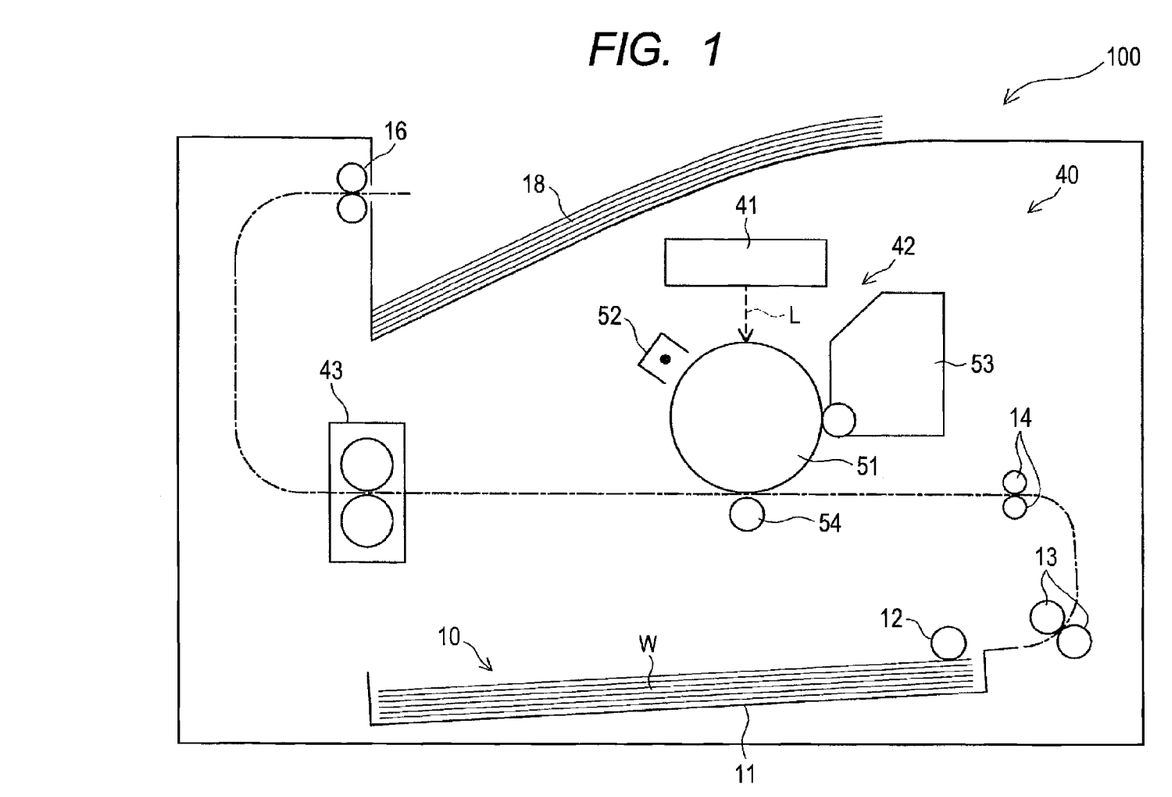
FIG. 1 is a schematic view showing the configuration of a printer.

The configuration of a printer 100 according to an embodiment will be described with reference to FIGS. 1 to 4. The printer 100 of the present embodiment forms an image on a sheet W by an electrophotographic method. As shown in FIG. 1, the printer 100 includes a paper feeding unit 10 and an image forming unit 40. The printer 100 is an example of an image forming system.

The paper feeding unit 10 includes a tray 11, a pickup roller 12, a conveying roller 13 and a registration roller 14. Sheets W stored in the tray 11 are taken out with the pickup roller 12 one sheet at a time, the sheet W is conveyed by the conveying roller 13, its position is corrected with the registration roller 14 and the sheet W is fed to the image forming unit 40 with particular timing.

The image forming unit 40 includes an exposure unit 41, a process unit 42 and a fixing unit 43. The exposure unit 41 applies a laser light L to a photosensitive member 51, which will be described later. The configuration of the exposure unit 41 will be described later.

The process unit 42 includes the photosensitive member 51, a charger 52, a developing unit 53 and a transfer roller 54. The charger 52 uniformly charges the surface of the photosensitive member 51. When the laser light L is irradiated from the exposure unit 41 described above onto the surface of the photosensitive member 51 uniformly charged by the charger 52, an electrostatic latent image is formed on the surface of the photosensitive member 51. The developing unit 53 supplies toner to develop the electrostatic latent image formed on the surface of the photosensitive member 51. In this way, a toner image is formed on the surface of the photosensitive member 51. The transfer roller 54 is arranged opposite the photosensitive member 51, and transfers the toner image formed on the surface of the photosensitive member 51 to the sheet W which is conveyed.

The fixing unit 43 is arranged on the downstream side in the conveying direction of the sheet W with respect to the photosensitive member 51, and fixes the toner image to the sheet W by heat. Thereafter, the sheet W is discharged through a discharge roller 16 to a discharge tray 18 formed on the upper surface of the printer 100.

Figure 2:
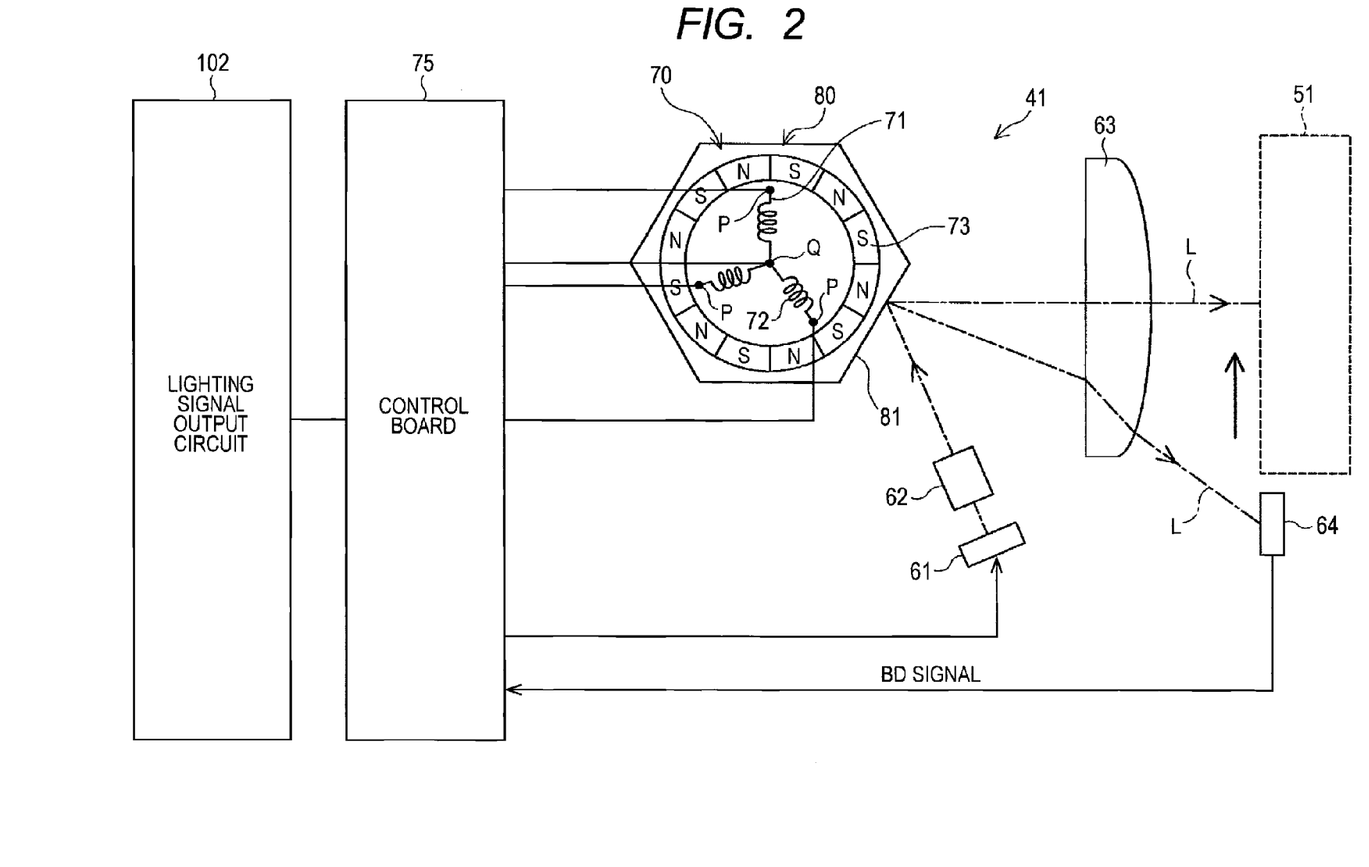
FIG. 2 is a schematic view showing the configuration of an exposure unit.

As shown in FIG. 2, the exposure unit 41 includes a laser diode (hereinafter referred to as an "LD") 61 that emits the laser light L, a first lens portion 62, a polygon mirror 80, a polygon motor 70, a second lens portion 63, a beam detector (hereinafter referred to as a "BD") 64 and a control board 75. The LD 61 is an example of a light source, and the polygon motor 70 is an example of a motor, and the laser light L is an example of a light beam. The polygon mirror 80 is an example of a rotating member, and the BD 64 is an example of a light receiver.

The polygon motor 70 is a three-phase brushless DC motor, and includes a stator 71 and a rotor 73 where a 12-pole permanent magnet is arranged. The stator 71 includes coils 72 corresponding to the three phases (U phase, V phase, and W phase, for example). The coils 72 are electrically connected to each other by star wiring connection.

The polygon mirror 80 includes 6 mirror surfaces 81 that are arranged to form the side surface of a regular hexagonal prism. The polygon mirror 80 is driven to rotate by the polygon motor 70. Specifically, the polygon mirror 80 is fixed to the rotor 73 of the polygon motor 70, and is rotated as the rotor 73 is rotated.

The first lens portion 62 is formed with, for example, a cylindrical lens, and applies the laser light L emitted from the LD 61 toward the polygon mirror 80. The second lens portion 63 is formed with, for example, an fθ lens, and applies the laser light L applied from the first lens portion 62 and reflected off the mirror surfaces 81 of the polygon mirror 80 toward the surface of the photosensitive member 51.

The photosensitive member 51 is disposed at a position to which laser light L reflected by the polygon mirror 80 is irradiated. When the polygon mirror 80 rotates due to rotation of the rotor 73, the angle of the mirror surface 81 relative to the irradiate direction of laser light L from the first lens portion 62 changes cyclically, and hence the laser light L is deflected cyclically by the mirror surface 81. By this operation, a scanning line by the laser light L is formed on the surface of the photosensitive member 51.

The BD 64 is disposed at a position at which the BD 64 receives the laser light L reflected by the polygon mirror 80. Specifically, the BD 64 is disposed at a position through which the laser light L reflected by the polygon mirror 80 passes before scanning the photosensitive member 51, the position being a position at which the BD 64 receives the laser light L reflected by the mirror surface 81 in a state where the angle of the mirror surface 81 relative to the irradiate direction of the laser light L is a particular angle.

Figure 5:
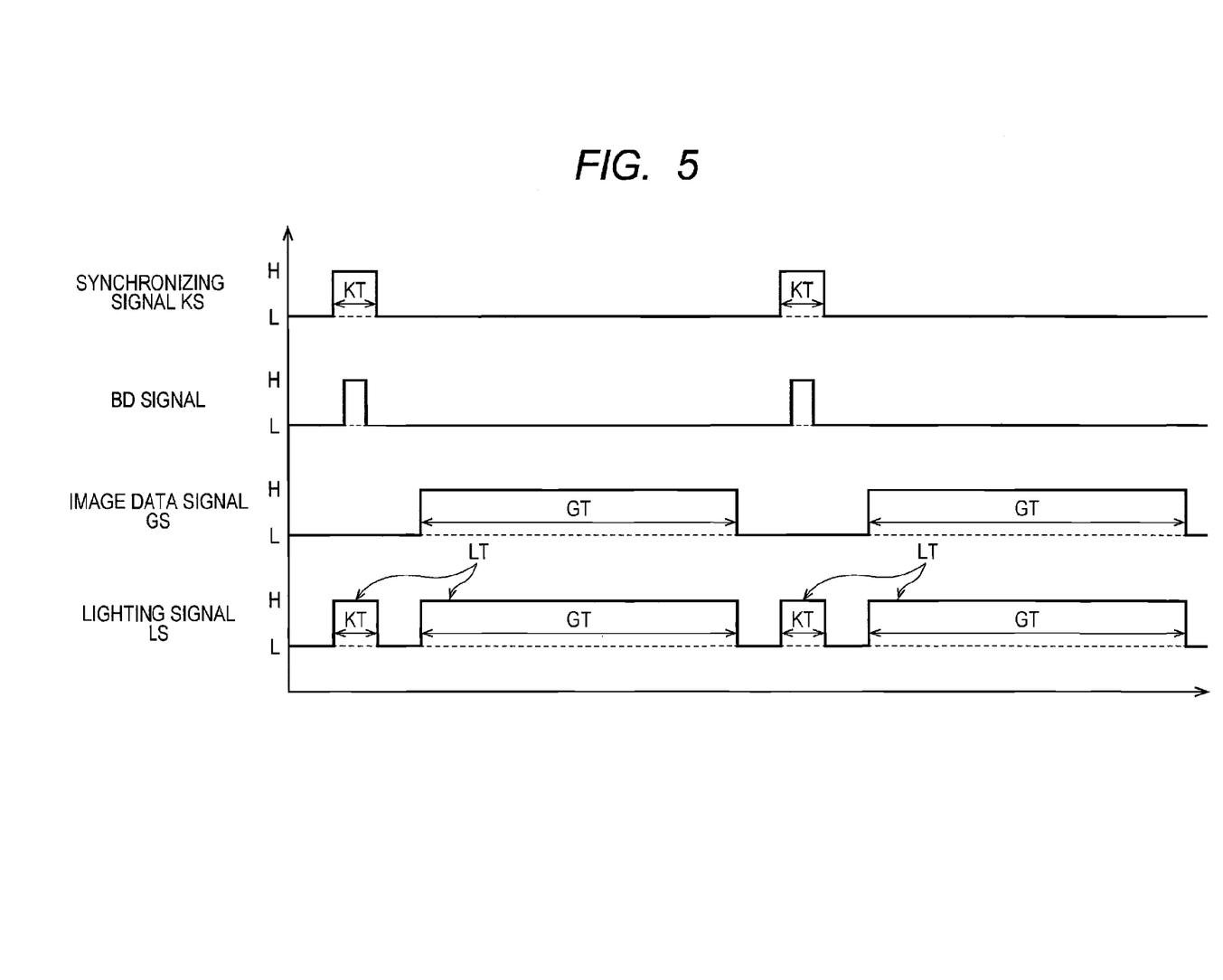
FIG. 5 is a timing chart showing the waveforms of a synchronizing signal, a BD signal, an image data signal, and a lighting signal.

The BD 64 outputs a BD signal in response to reception of the laser light L. The BD signal is shown in FIG. 5. The BD signal is a signal that becomes L level at timing when laser light L is not received and that becomes H level at timing when laser light L is received. The BD signal is an example of an output signal. The control board 75 and a lighting signal output circuit 102 connected to the control board 75 will be described later in greater detail.

Figure 3:
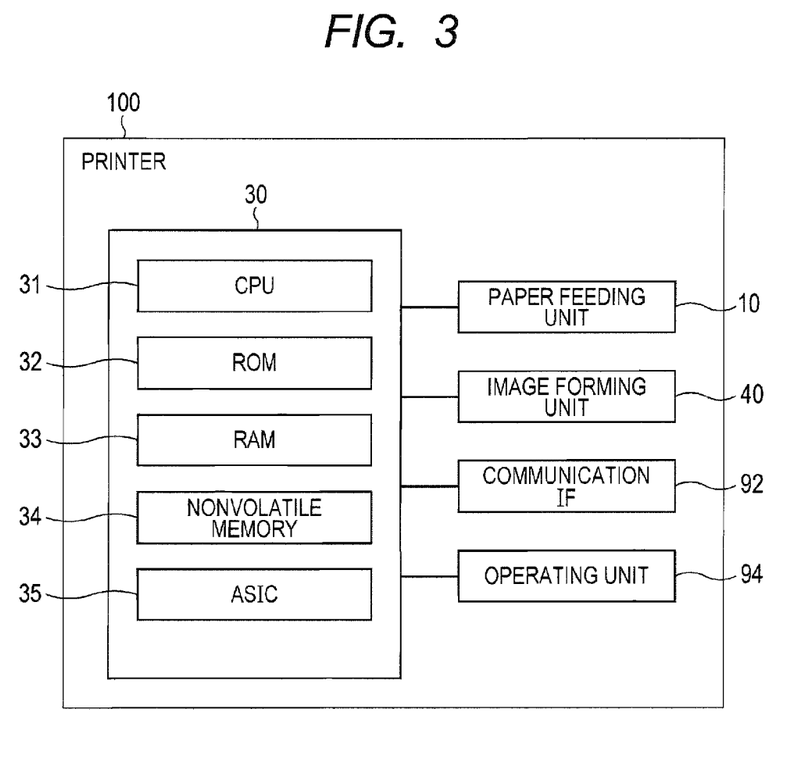
FIG. 3 is a block diagram showing the configuration of the printer.
Figure 4:
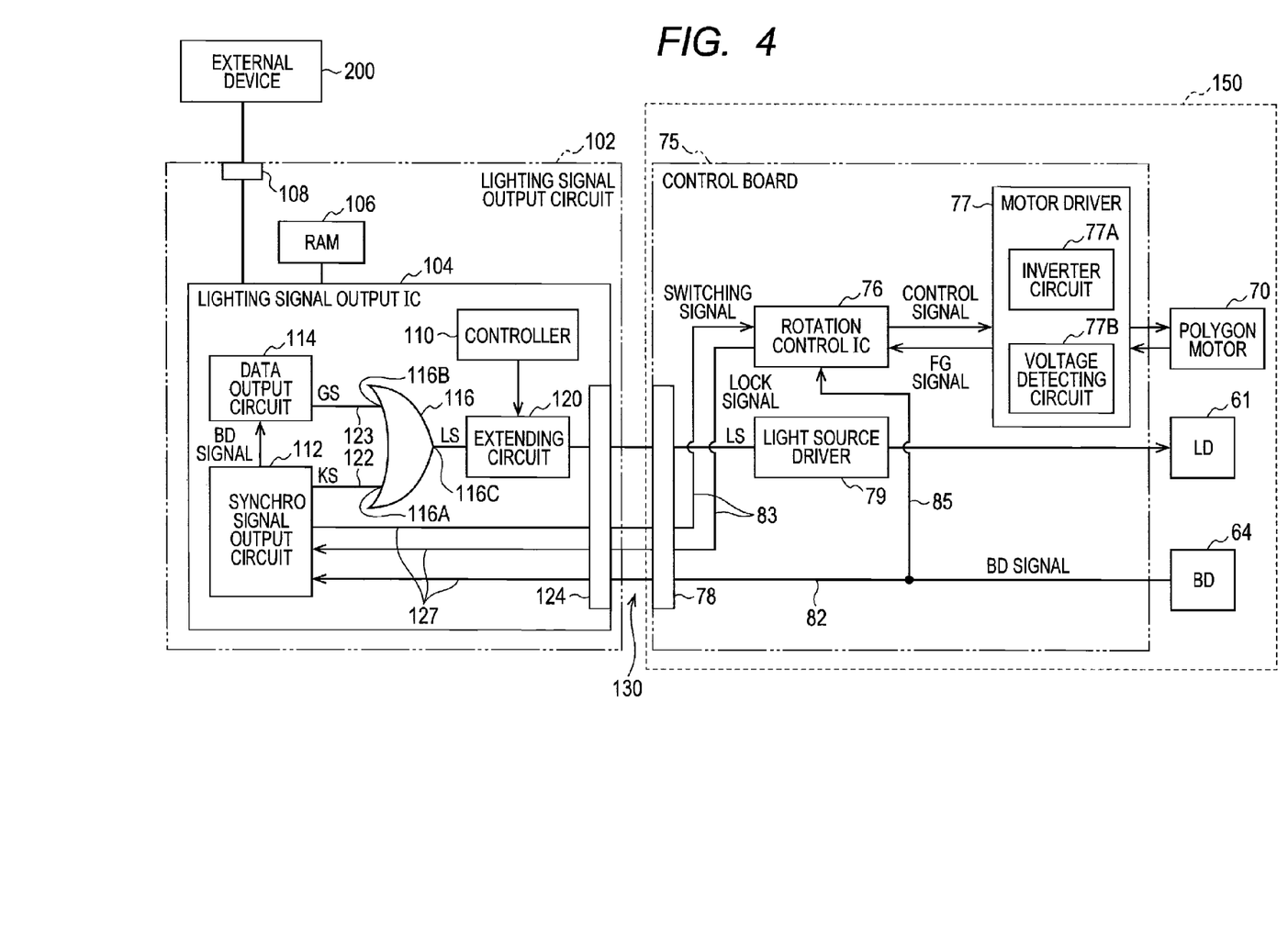
FIG. 4 is a block diagram showing the configurations of a control board and a lighting signal output circuit.

As shown in FIG. 3, the printer 100 includes, in addition to the paper feeding unit 10 and the image forming unit 40 described above, a communication interface (communication I/F) 92 for connecting to an external device 200 shown in FIG. 4, for example, an operating unit 94 that receives an operation by a user, and a controller 30 that controls the printer 100.

The operating unit 94 includes various types of buttons and a touch panel (both of which are not shown) that receive the operation by the user. The touch panel also functions as a display unit that displays various types of information. The communication interface 92 is hardware that allows communication with the external device 200. Specifically, the communication interface 92 is, for example, a network interface, a serial communication interface, or a parallel communication interface. The printer 100 receives image data that is a print target through the communication interface 92 from the external device 200.

The controller 30 includes the CPU 31, a ROM 32, a RAM 33, a nonvolatile memory 34, and an ASIC (Application Specific Integrated Circuit) 35. In the ROM 32, a control program for controlling the printer 100, various types of settings, initial values and so on are stored. The RAM 33 is used as an operation area when the CPU 31 performs various types of programs or an area that temporarily stores data. The nonvolatile memory 34 is a rewritable memory such as an NVRAM, a flash memory, a HDD, an EEPROM, and so on. The ASIC 35 is a hardware circuit dedicated for, for example, image processing. The CPU 31 controls each element of the printer 100 according to the control program read from the ROM 32 and signals fed from various types of sensors.

Next, the control board 75 will be described. The control board 75 is a circuit that controls rotation of the polygon motor 70 and that controls lighting of the LD 61, in accordance with instructions form the CPU 31. As shown in FIG. 4, the control board 75 includes a rotation control IC 76, a motor driver 77, an apparatus-side communicator 78, and a light source driver 79.

The rotation control IC 76 controls rotation of the polygon motor 70. The rotation control IC 76 receives a BD signal through a wiring line 85 connecting the BD 64 with the rotation control IC 76. The rotation control IC 76 determines a rotational speed and a rotation cycle of the polygon mirror 80 by referring to the BD signal. Specifically, the rotation control IC 76 outputs a control signal to the motor driver 77, and uses the motor driver 77 to control rotation of the polygon motor 70. The rotation control IC 76 is an example of a rotation controller.

The motor driver 77 controls rotation of the polygon motor 70, based on a control signal received from the rotation control IC 76. The motor driver 77 includes an inverter circuit 77A and a voltage detecting circuit 77B. The inverter circuit 77A is a circuit that switches an energization state and a non-energization state of each coil 72 of the polygon motor 70. The voltage detecting circuit 77B detects voltages between an end point P of each coil 72 and a middle point Q of a star connection of the polygon motor 70 shown in FIG. 2.

As shown in FIG. 2, when a rotor 73 of the polygon motor 70 rotates, S-pole magnets and N-pole magnets approaches each coil 72 of a stator 71 alternately. With this operation, a magnetic flux in each coil 72 changes, and induction voltage is generated in each coil 72. The induction voltage shows a waveform that changes cyclically to different levels between a case where an S-pole approaches and a case where an N-pole approaches.

The motor driver 77 converts the induction voltage detected by the voltage detecting circuit 77B into a signal that inverts its level in response to changes of the induction voltage, that is, switching of polarity of magnets approaching each coil (hereinafter referred to as "FG signal"), and outputs the signal to the rotation control IC 76. The FG signal is an example of a frequency signal.

The FG signal has a frequency corresponding to the rotational speed of the polygon motor 70. Hence, by referring to the FG signal, the rotational speed and the rotation cycle of the polygon motor 70 are determined. Hence, the rotation control IC 76 controls rotation of the polygon motor 70 based on the BD signal or the FG signal. A rotation control process of the polygon motor 70 by the rotation control IC 76 will be described in greater detail.

The apparatus-side communicator 78 is electrically connected to a lighting signal output IC 104 of the lighting signal output circuit 102 described later. More specifically, the apparatus-side communicator 78 is connected to a chip-side communicator 124 of the lighting signal output IC 104, so as to perform communication with the chip-side communicator 124. The apparatus-side communicator 78 transmits, to the lighting signal output IC 104, the BD signal inputted through a wiring line 82 connecting the apparatus-side communicator 78 with the BD 64, for example, and receives a lighting signal LS from the lighting signal output IC 104. The light source driver 79 controls lighting of the LD 61 based on the lighting signal LS received by the apparatus-side communicator 78.

Next, the lighting signal output circuit 102 will be described. The lighting signal output circuit 102 includes the lighting signal output IC 104 that outputs the lighting signal LS, a RAM 106, and a communication interface 108 connecting to the external device 200. The lighting signal output IC 104 is an example of an integrated circuit chip. As indicated by the broken lines 150 in FIG. 4, the configuration other than the lighting signal output circuit 102 of the printer 100 including the control board 75 and so on connected to the lighting signal output IC 104 is an example of an image forming apparatus.

The lighting signal output IC 104 includes a controller 110, a chip-side communicator 124, a synchronizing (synchro) signal output circuit 112, a data output circuit 114, an OR circuit 116, and an extending circuit 120. The controller 110 controls each circuit of the lighting signal output IC 104, in accordance with instructions from the CPU 31. The chip-side communicator 124 is connected to the apparatus-side communicator 78 through a wiring line 130 outside the lighting signal output IC 104, and transmits the lighting signal LS to the control board 75, for example.

The synchronizing signal output circuit 112 outputs a synchronizing signal KS for lighting the LD 61 at the timing when it is assumed that laser light L reflected by the polygon mirror 80 is received by the BD 64. As shown in FIG. 5, the synchronizing signal KS is a signal that becomes H level at the timing when the LD 61 is lighted and that becomes L level at the timing other than that. When a BD signal is inputted from the BD 64 based on output of the synchronizing signal KS, the synchronizing signal output circuit 112 outputs the BD signal to the data output circuit 114.

Further, the synchronizing signal output circuit 112 executes a signal output process of outputting a switching signal to the rotation control IC 76 when the BD signal is inputted through a wiring line 127 connecting the chip-side communicator 124 with the synchronizing signal output circuit 112. The signal output process of the switching signal by the synchronizing signal output circuit 112 will be described in greater detail. The switching signal is an example of an instruction signal. The synchronizing signal output circuit 112 is an example of a synchronizing signal output circuit and an instruction signal output circuit.

The RAM 106 temporarily stores image data acquired from the external device 200 through the communication interface 108. The data output circuit 114 outputs an image data signal GS for lighting the LD 61 at the timing when a scanning line is formed on the photosensitive member 51, in response to reception of laser light L by the BD 64. Specifically, upon receiving the BD signal from the synchronizing signal output circuit 112, the data output circuit 114 outputs the image data signal GS based on the image data stored in the RAM 106 after a margin period in a main scanning direction elapses from the timing when the BD signal changes to H level. That is, writing start timing of a scanning line by the laser light L is determined by the BD signal. As shown in FIG. 5, the image data signal GS is a signal that becomes H level at the timing when the LD 61 is lighted and that becomes L level at the timing other than that.

The OR circuit 116 outputs the lighting signal LS that is the logical sum of the synchronizing signal KS and the image data signal GS. One input terminal 116A of the OR circuit 116 is connected to the synchronizing signal output circuit 112 through a wiring line 122, so that the synchronizing signal KS is inputted to the input terminal 116A. Another input terminal 116B of the OR circuit 116 is connected to the data output circuit 114 through a wiring line 123, so that the image data signal GS is inputted to the input terminal 116B. With this configuration, the lighting signal LS, which is the logical sum of the synchronizing signal KS and the image data signal GS, is outputted from the output terminal 116C of the OR circuit 116. The wiring line 122 is an example of a first wiring line, and wiring line 123 is an example of a second wiring line.

The lighting signal LS is a signal that becomes H level at the timing when the LD 61 is lighted and that becomes L level at the timing other than that. As shown in FIG. 5, a period in which the lighting signal LS is H level (hereinafter referred to as "lighting period LT") includes a period in which the synchronizing signal KS is H level (hereinafter referred to as "forced lighting period KT") and a period in which the image data signal GS is H level (hereinafter referred to as "exposure lighting period GT"). The exposure lighting period GT is an example of a lighting period based on an image data signal.

The forced lighting period KT is set based on the synchronizing signal KS, and is set to a sufficient length for the BD 64 to receive laser light L. On the other hand, the exposure lighting period GT is set based on the image data signal GS. The image data signal GS repeats changing between H level and L level depending on image data. Hence, as shown in FIG. 6, the exposure lighting period GT includes a unit lighting period UT of which a period of H level is shorter than the forced lighting period KT.

Figure 6:
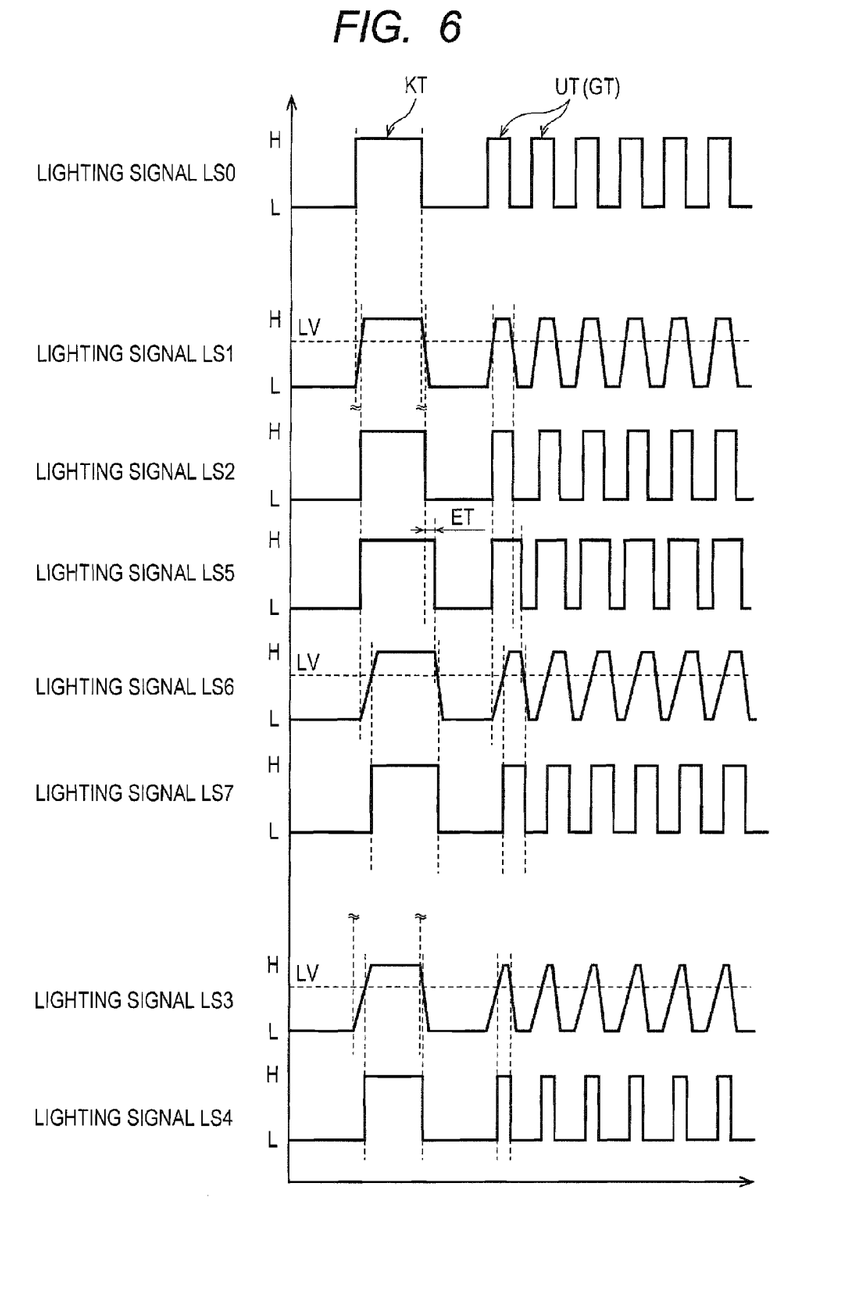
FIG. 6 is a timing chart showing the waveforms of the lighting signal.

FIG. 6 shows waveforms of the lighting signal LS. A lighting signal LS0 is a lighting signal in an ideal state in which the synchronizing signal KS and the image data signal GS have no attenuation. A lighting signal LS1 is a lighting signal that is outputted from the OR circuit 116. A lighting signal LS2 is a lighting signal that is obtained by binarizing the lighting signal LS1 by using a certain threshold value LV. A binarization process of the lighting signal is performed by the extending circuit 120 and the light source driver 79.

The synchronizing signal KS is inputted to the OR circuit 116 through the wiring line 122 in the lighting signal output IC 104. Further, the image data signal GS is inputted to the OR circuit 116 through the wiring line 123 in the lighting signal output IC 104. Hence, compared with a case in which the synchronizing signal KS and the image data signal GS are inputted to the OR circuit 116 through the wiring line 130 outside the lighting signal output IC 104, the signals are less likely to be affected by noises and crosstalk from outside the lighting signal output IC 104, and their waveforms are less likely to be deformed. Accordingly, when the lighting signal LS1 is compared with the lighting signal LS0, the shortened amounts of the forced lighting period KT and the exposure lighting period GT are small.

On the other hand, the lighting signal LS outputted from the lighting signal output IC 104 is outputted to the light source driver 79 through the wiring line 130 outside the lighting signal output IC 104, and thereby attenuated. A lighting signal LS3 in FIG. 6 shows a waveform of a lighting signal, assuming a case that the lighting signal LS1 is outputted from the lighting signal output IC 104 and is inputted to the light source driver 79. A lighting signal LS4 shows a waveform of a lighting signal that is obtained by binarizing the lighting signal LS3 by using a certain threshold value LV.

As shown in FIG. 6, the shortened amounts of the forced lighting period KT and the exposure lighting period GT when the lighting signal LS4 is compared with the lighting signal LS0 are greater than the shortened amounts of the forced lighting period KT and the exposure lighting period GT when the lighting signal LS2 is compared with the lighting signal LS0. Thus, when the length of the unit lighting period UT included in the exposure lighting period GT is shortened, there is a case that the LD 61 is not lighted sufficiently by using the unit lighting period UT.

The lighting signal output IC 104 of the present embodiment is provided with the extending circuit 120 that extends the lighting period LT based on the lighting signal LS. The extending circuit 120 has a plurality of extension periods ET for extending the lighting period LT, and selects one extension period ET for extending the lighting period LT in accordance with instructions from the controller 110.

The extending circuit 120 generates a lighting signal LS2 from the lighting signal LS1. The extending circuit 120 extends the lighting period LT by delaying falling timing of the forced lighting period KT and the exposure lighting period GT of the lighting signal LS2, that is, end timing of each lighting period, by the selected extension period ET. The extending circuit 120 outputs, to the light source driver 79, the lighting signal LS5 that is obtained by extending the lighting period LT of the lighting signal LS2. The lighting signal LS5 is shown in FIG. 6.

As shown in FIG. 6, a lighting signal LS6 is a lighting signal that is obtained when the lighting signal LS5 is outputted from the lighting signal output IC 104 and is inputted to the light source driver 79. Further, a lighting signal LS7 is a lighting signal that is obtained by binarizing the lighting signal LS6 by using a certain threshold value LV. The lighting period LT of the lighting signal LS7 is substantially equal to the lighting period LT of the lighting signal LS0, and hence the LD 61 can be lighted sufficiently by using the unit lighting period UT.

Figure 7:
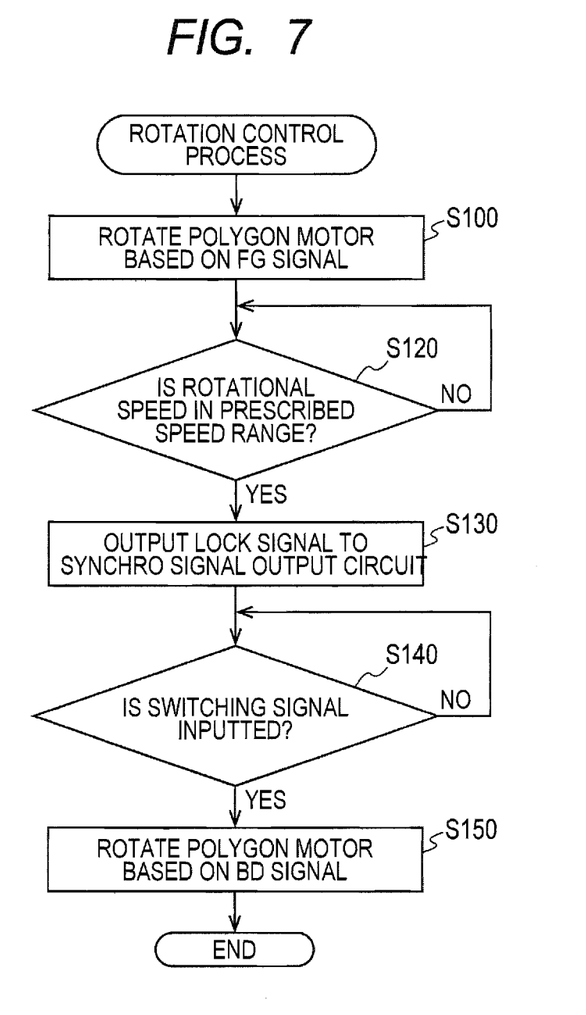
FIG. 7 is a flowchart showing the flow of a rotation control process.
Figure 8:
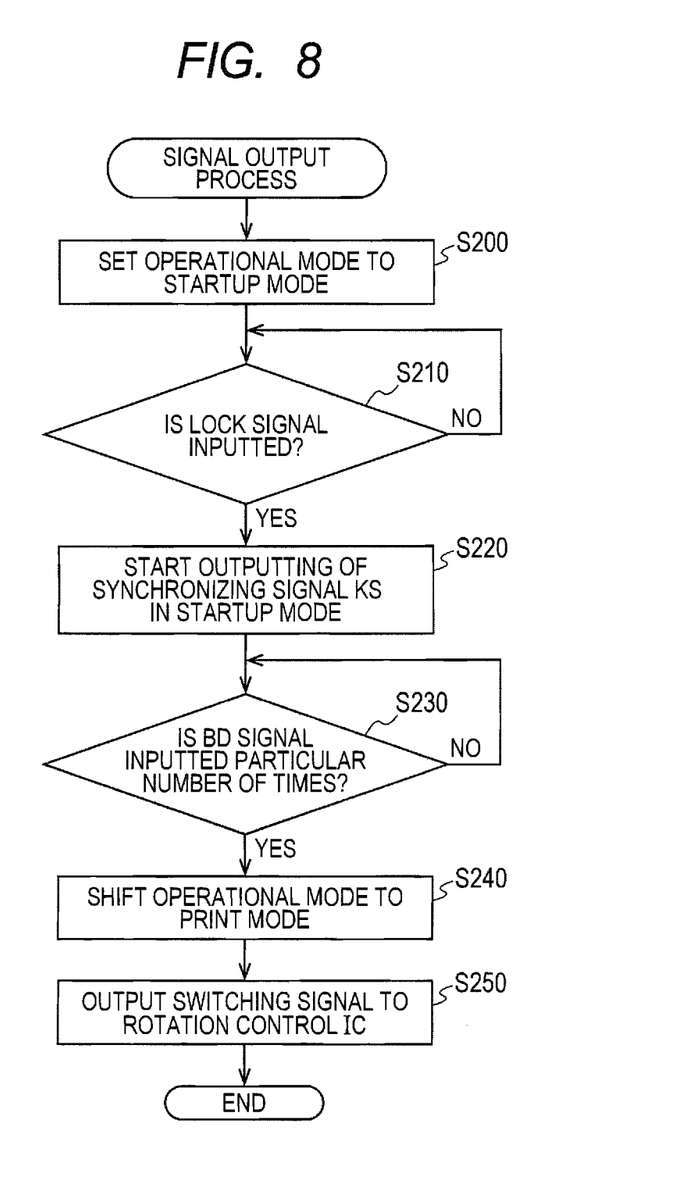
FIG. 8 is a flowchart showing the flow of a signal output process.

Next, specific flows of a rotation control process and a signal output process will be described while referring to FIGS. 7 and 8. These processes are started when a print instruction from a user is received through the operating unit 94. First, the rotation control process by the rotation control IC 76 will be described while referring to FIG. 7. Upon starting the rotation control process, the rotation control IC 76 sets to use an FG signal for determining the rotational speed of the polygon motor 70, and starts rotating the polygon motor 70 (S100). The rotation control IC 76 uses the inverter circuit 77A of the motor driver 77 to switch an energization state and a non-energization state of each coil 72 of the polygon motor 70, so as to increase the rotational speed of the polygon motor 70.

The rotation control IC 76 determines the rotational speed of the polygon motor 70 based on the FG signal, and determines whether the rotational speed of the polygon motor 70 has reached a prescribed speed range (S120). If it is determined that the rotational speed of the polygon motor 70 has not reached the prescribed speed range (S120: NO), the rotation control IC 76 determines the rotational speed of the polygon motor 70 based on the FG signal and repeats the process of S120.

Because the FG signal is generated based on induction voltage generated in each coil 72 of the polygon motor 70, the FG signal is generated in a low-speed rotation state in which the rotational speed of the polygon motor 70 is lower than the prescribed speed range. Hence, in the low-speed rotation state of the polygon motor 70, the rotation control IC 76 controls the rotational speed of the polygon motor 70 based on the FG signal.

On the other hand, induction voltage is not outputted in a period directly after each coil 72 is switched to the non-energization state (hereinafter referred to as "regeneration period"), for example, and thus the FG signal becomes unstable in the regeneration period. The regeneration period continues for a certain period, regardless of the rotational speed of the polygon motor 70. Hence, in a high-speed rotation state in which the rotational speed has reached a prescribed speed, the rotation control IC 76 cannot control the rotational speed of the polygon motor 70 accurately based on the FG signal.

In contrast, the BD signal is outputted in the high-speed rotation state of the polygon motor 70, and is outputted regardless of changes in the state of each coil 72. Hence, in the high-speed rotation state of the polygon motor 70, the rotational speed of the polygon motor 70 can be controlled more accurately based on the BD signal than a case in which it is controlled based on the FG signal.

For switching the FG signal and the BD signal based on the rotational speed of the polygon motor 70, if it is determined that the rotational speed of the polygon motor 70 has reached the prescribed speed range (S120: YES), the rotation control IC 76 transmits a lock signal to the synchronizing signal output circuit 112 through the wiring line 83 connecting the apparatus-side communicator 78 with the rotation control IC 76 and through the apparatus-side communicator 78 (S130). The lock signal is shown in FIG. 4.

After transmitting the lock signal to the synchronizing signal output circuit 112, the rotation control IC 76 determines whether a switching signal is inputted from the synchronizing signal output circuit 112 (S140). If it is determined that the switching signal is not inputted (S140: NO), the rotation control IC 76 waits for input of the switching signal. On the other hand, if it is determined that the switching signal is inputted (S140: YES) when the polygon motor 70 is rotated based on the FG signal, the rotation control IC 76 switches the signal used for controlling the rotational speed of the polygon motor 70 from the FG signal to the BD signal, and rotates the polygon motor 70 based on the BD signal (S150). By this operation, the rotation control IC 76 accurately controls the rotational speed of the polygon motor 70 in both the low-speed rotation state and the high-speed rotation state of the polygon motor 70.

Next, the signal output process by the synchronizing signal output circuit 112 will be described while referring to FIG. 8. Upon starting the signal output process, the synchronizing signal output circuit 112 sets an operational mode to a startup mode (S200). The startup mode is an operational mode in which transfer of the BD signal from the synchronizing signal output circuit 112 to the data output circuit 114 is stopped. In an initial state of the startup mode, output of the synchronizing signal KS from the synchronizing signal output circuit 112 is stopped, and hence no BD signal is inputted to the synchronizing signal output circuit 112.

The synchronizing signal output circuit 112 waits for the lock signal to be inputted from the rotation control IC 76 (S210: NO). Specifically, the synchronizing signal output circuit 112 determines whether voltage of a signal inputted from the rotation control IC 76 exceeds a prescribed value, and waits for input of a signal of voltage exceeding the prescribed value, that is, the lock signal. And, when the lock signal is inputted from the rotation control IC 76 (S210: YES), since the polygon motor 70 becomes the high-speed rotation state, the synchronizing signal output circuit 112 starts outputting of the synchronizing signal KS in the startup mode (S220).

The synchronizing signal output circuit 112 waits for the BD signal to be inputted from the BD 64 (S230: NO). Specifically, the synchronizing signal output circuit 112 determines whether the voltage of the signal inputted from the BD 64 exceeds the prescribed value, and waits for input of the signal of the voltage exceeding the prescribed value, that is, the BD signal. More specifically, the synchronizing signal output circuit 112 waits for the BD signal to be inputted from the BD 64 a particular plurality of times (hereinafter referred to as "particular number of times").

When the BD signal is inputted from the BD 64 the particular number of times in response to output of the synchronizing signal KS (S230: YES), the synchronizing signal output circuit 112 determines that the BD signal and the synchronizing signal KS are synchronized, that is, the BD signal is inputted from the BD 64 in response to output of the synchronizing signal KS, and shifts the operational mode from the startup mode to a print mode (S240). The print mode is an operational mode in which the BD signal is transferred from the synchronizing signal output circuit 112 to the data output circuit 114. By this operation, the data output circuit 114 outputs the image data signal GS, so that a scanning line is formed on the photosensitive member.

Further, in response to input of the BD signal from the BD 64, the synchronizing signal output circuit 112 outputs the switching signal to the rotation control IC 76 through the wiring line 127 and the chip-side communicator 124 (S250). By this operation, the rotation control IC 76 rotates the polygon motor 70 based on the BD signal.

As described above, in the printer 100 of the present embodiment, the BD signal is inputted, through the wiring line 85, to the rotation control IC 76 disposed outside the lighting signal output IC 104. Further, the switching signal is inputted, through the wiring lines 127, 83, from the synchronizing signal output circuit 112 of the lighting signal output IC 104. Hence, although the rotation control IC 76 is provided outside the lighting signal output IC 104, rotation of the polygon motor 70 and the polygon mirror 80 can be controlled by using the BD signal and the switching signal.

In the printer 100 of the present embodiment, the synchronizing signal output circuit 112 outputs the switching signal in response to synchronization between the synchronizing signal KS outputted by the synchronizing signal output circuit 112 and the BD signal inputted due to output of the synchronizing signal KS. And, in response to input of the switching signal from the synchronizing signal output circuit 112, the rotation control IC 76 controls rotation of the motor based on the BD signal that is synchronized with the synchronizing signal KS. Hence, compared with a case in which the rotation control IC 76 controls rotation of the polygon motor 70 based on the BD signal that is not synchronized with the synchronizing signal KS, rotation of the polygon motor 70 can be controlled more accurately.

In the printer 100 of the present embodiment, it is determined that the BD signal and the synchronizing signal KS are synchronized in response to a plurality of times of input of the BD signal from the BD 64 to the synchronizing signal output circuit 112. Hence, an erroneous determination can be suppressed that the output signal and the synchronizing signal are synchronized in response to a single input of the BD signal in the synchronizing signal output circuit 112, due to noises and so on.

In the lighting signal output IC 104 included in the printer 100 of the present embodiment, the synchronizing signal output circuit 112, the data output circuit 114, and the OR circuit 116 are provided within the same lighting signal output IC, and the synchronizing signal KS and the image data signal GS are inputted to the OR circuit 116 through the wiring lines 122, 123 in the lighting signal output IC. Hence, compared with a case in which the synchronizing signal output circuit 112, the data output circuit 114, and the OR circuit 116 are provided separately at a plurality of integrated circuit chips, and the synchronizing signal KS and the image data signal GS are inputted to the OR circuit 116 through wiring outside the integrated circuit chip, it is suppressed that the waveform of the synchronizing signal KS changes before the synchronizing signal KS is inputted from the synchronizing signal output circuit 112 to the OR circuit 116. Further, the above-mentioned configuration can suppress changes of the waveform of the image data signal GS before the image data signal GS is inputted from the data output circuit 114 to the OR circuit 116.

In the lighting signal output IC 104 included in the printer 100 of the present embodiment, the extending circuit 120 is provided, and the lighting period LT based on the lighting signal LS is extended by the extending circuit 120. Hence, even when the waveform of the lighting signal LS changes after being outputted from the lighting signal output IC 104 and before being inputted to the light source driver 79, shortening of the lighting period LT relative to the lighting period LT before being extended can be suppressed.

While the disclosure has been described in detail with reference to the above aspects thereof, it would be apparent to those skilled in the art that various changes and modifications may be made therein without departing from the scope of the claims.

For example, the processes performed by one CPU 31 in the above-described embodiment may be performed a plurality of CPUs, may be performed only by a dedicated hardware circuit such as the ASIC 35, or may be performed by a combination of a CPU and a hardware circuit.

Although in the above-described embodiment the printer 100 is described as an example of the image forming apparatus, the image forming apparatus includes a multi-function peripheral and so on. Further, in the above-described embodiment, the printer 100 of monochromatic-type that forms images by using toner of one color is described as an example of the image forming apparatus. Another example of the image forming apparatus includes a color printer that forms images by using toner of a plurality of colors. The present disclosure can be applied to such a color printer.

In the above-described embodiment, the number of poles of the rotor 73 is 12, and number of mirror surfaces 81 of the polygon mirror 80 is six. However, the number of poles of the rotor 73 and the number of mirror surfaces 81 of the polygon mirror 80 are not limited to these numbers.

Further, the configuration and function of the synchronizing signal output circuit 112 in the above-described embodiment are merely an example, and various modifications can be made. For example, in the above-described embodiment, the synchronizing signal output circuit 112 outputs the synchronizing signal KS to the OR circuit 116, and also outputs the switching signal to the rotation control IC 76. However, the configuration of outputting the switching signal may be another configuration (a circuit and so on) separate from the synchronizing signal output circuit 112.

Further, the controller 110 that controls the synchronizing signal output circuit 112 may output the switching signal. Or, the data output circuit 114 to which the BD signal is transferred from the synchronizing signal output circuit 112 may output the switching signal.

Further, in the above-described embodiment, the extending circuit 120 is provided at a downstream side of the OR circuit 116 so as to extend the lighting period LT based on the lighting signal LS. However, the extending circuit 120 may be provided on the wiring line 123 between the data output circuit 114 and the OR circuit 116, so as to extend the exposure lighting period GT based on the image data signal GS.

What is claimed is:

1. An image forming system comprising:
   an integrated circuit chip; and
   an image forming apparatus configured to be connected to the integrated circuit chip, the image forming apparatus comprising:
      a light source;
      a motor;
      a rotating member configured to be rotated by the motor and to reflect a light beam emitted from the light source;
      a photosensitive member configured to be irradiated by the light beam reflected by the rotating member;
      a light receiver configured to receive the light beam reflected by the rotating member;
      a rotation controller configured to control rotation of the motor, by switching a signal for controlling rotation of the motor between a frequency signal having frequency depending on a rotational speed of the motor and an output signal that is outputted in response to reception of the light beam by the light receiver;
   a first wiring line configured to connect the light receiver with the rotation controller;
   an apparatus-side communicator configured to transmit the output signal to the integrated circuit;
   a second wiring line configured to connect the light receiver with the apparatus-side communicator; and
   a third wiring line configured to connect the apparatus-side communicator with the rotation controller,
   the integrated circuit chip comprising:
      a synchronizing signal output circuit configured to output a synchronizing signal for lighting the light source;
      a data output circuit configured to output an image data signal for lighting the light source;

an OR circuit configured to output, to the light source, a lighting signal that is a logical sum of the synchronizing signal and the image data signal;
a chip-side communicator electrically connectable to the apparatus-side communicator, the chip-side communicator being configured to transmit the lighting signal to the image forming apparatus through the apparatus-side communicator; and
an instruction signal output circuit configured to output an instruction signal to the rotation controller in response to input of the output signal; and
a fourth wiring line configured to connect the instruction signal output circuit with the chip-side communicator,
wherein the rotation controller is arranged outside the integrated circuit chip and inside the image forming apparatus;
wherein the instruction signal output circuit is configured to output the instruction signal to the rotation controller through the fourth wiring line, the chip-side communicator, the apparatus-side communicator, and the third wiring line; and
wherein, in response to input of the instruction signal in a state where the motor is rotated based on the frequency signal, the rotation controller is configured to switch the signal for controlling rotation of the motor to the output signal that is received from the light receiver through the first wiring line.

2. The image forming system according to claim 1, wherein the instruction signal output circuit is configured to output the instruction signal, in response to synchronization between the output signal and the synchronizing signal.

3. The image forming system according to claim 2, wherein the instruction signal output circuit is configured to determine that the output signal and the synchronizing signal are synchronized, in response to a plurality of times of input of the output signal to the synchronizing signal output circuit.

4. The image forming system according to claim 1, wherein the integrated circuit chip further comprises:
an extending circuit provided at a downstream side of the OR circuit so as to extend a lighting period based on the lighting signal.

5. The image forming system according to claim 1, wherein the integrated circuit chip further comprises:
an extending circuit provided between the data output circuit and the OR circuit so as to extend a lighting period based on the image data signal.

6. The image forming system according to claim 1, wherein, when the rotational speed of the motor reaches a prescribed speed range, the rotation controller is configured to transmit a lock signal to the synchronizing signal output circuit through the apparatus-side communicator and the chip-side communicator; and
wherein, in response to receiving the lock signal from the rotation controller through the chip-side communicator, the synchronizing signal output circuit is configured to start outputting the synchronizing signal to the OR circuit.

7. An integrated circuit chip configured to be connected to an image forming apparatus having a light source, a motor, a rotating member rotated by the motor, a photosensitive member, a light receiver, a rotation controller, a third wiring line for connecting the light receiver with the rotation controller, an apparatus-side communicator, a forth wiring line for connecting the light receiver with the apparatus-side communicator and a fifth wiring line for connecting the apparatus-side communicator with the rotation controller, the integrated circuit chip comprising:
a synchronizing signal output circuit configured to output a synchronizing signal for lighting the light source;
a data output circuit configured to output an image data signal for lighting the light source;
an OR circuit configured to output a lighting signal that is a logical sum of the synchronizing signal and the image data signal;
a chip-side communicator configured to transmit the lighting signal to the image forming apparatus, the chip-side communicator being configured to transmit the lighting signal to the image forming apparatus through the apparatus-side communicator;
a first wiring line connecting the synchronizing signal output circuit with the OR circuit; and
a second wiring line connecting the data output circuit with the OR circuit;
an instruction signal output circuit configured to output an instruction signal to the rotation controller in response to input of the output signal; and
a sixth wiring line configured to connect the instruction signal output circuit with the chip-side communicator,
wherein the rotation controller is arranged outside the integrated circuit chip and inside the image forming apparatus;
wherein the instruction signal output circuit is configured to output the instruction signal to the rotation controller through the sixth wiring line, the chip-side communicator, the apparatus-side communicator, and the fifth wiring line; and
wherein, in response to input of the instruction signal in a state where the motor is rotated based on the frequency signal, the rotation controller is configured to switch the signal for controlling rotation of the motor to the output signal that is received from the light receiver through the third wiring line.

8. The integrated circuit chip according to claim 7, wherein the instruction signal output circuit is configured to output the instruction signal in response to synchronization between the output signal and the synchronizing signal.

9. The integrated circuit chip according to claim 8, wherein the instruction signal output circuit is configured to determine that the output signal and the synchronizing signal are synchronized, in response to a plurality of times of input of the output signal to the synchronizing signal output circuit.

10. The integrated circuit chip according to claim 7, further comprising:
an extending circuit provided at a downstream side of the OR circuit so as to extend a lighting period based on the lighting signal.

11. The integrated circuit chip according to claim 7, further comprising:
an extending circuit provided between the data output circuit and the OR circuit so as to extend a lighting period based on the image data signal.

12. The integrated circuit chip according to claim 7, wherein, in response to receiving a lock signal from the image forming apparatus through the chip-side communicator, the synchronizing signal output circuit is configured to start outputting the synchronizing signal to the OR circuit.

13. An image forming apparatus configured to be connected to an integrated circuit chip configured to output a lighting signal, the image forming apparatus comprising:
a light source;
a motor;

a rotating member configured to be rotated by the motor and to reflect a light beam emitted from the light source;

a photosensitive member configured to be irradiated by the light beam reflected by the rotating member;

a light receiver configured to receive the light beam reflected by the rotating member;

a rotation controller configured to control rotation of the motor, by switching a signal for controlling rotation of the motor between a frequency signal having frequency depending on a rotational speed of the motor and an output signal that is outputted in response to reception of the light beam by the light receiver;

a first wiring line configured to connect the light receiver with the rotation controller;

an apparatus-side communicator configured to transmit the output signal to the integrated circuit chip;

a second wiring line configured to connect the light receiver with the apparatus-side communicator; and a third wiring line configured to connect the apparatus-side communicator with the rotation controller, wherein the rotation controller is arranged outside the integrated circuit chip and inside the image forming apparatus; and wherein, in response to receiving an instruction signal from the integrated circuit chip through the apparatus-side communicator and the third wiring line in a state where the motor is rotated based on the frequency signal, the rotation controller is configured to switch the signal for controlling rotation of the motor to the output signal that is received from the light receiver through the first wiring line.

14. The image forming apparatus according to claim 13, wherein, when the rotational speed of the motor reaches a prescribed speed range, the rotation controller is configured to transmit a lock signal to the integrated circuit chip through the apparatus-side communicator.

* * * * *